United States Patent
Choi et al.

(10) Patent No.: US 11,509,460 B2
(45) Date of Patent: Nov. 22, 2022

(54) APPARATUS AND METHOD FOR PERFORMING MATRIX MULTIPLICATION OPERATION BEING SECURE AGAINST SIDE CHANNEL ATTACK

(71) Applicants: SAMSUNG SDS CO., LTD., Seoul (KR); Kookmin University Industry Academy Cooperation Foundation, Seoul (KR)

(72) Inventors: Kyu-Young Choi, Seoul (KR); Duk-Jae Moon, Seoul (KR); Ji-Hoon Cho, Seoul (KR); Dong Guk Han, Seoul (KR); Bo Yeon Sim, Seoul (KR); Jae Geun Moon, Seoul (KR); Ae Sun Park, Gyeonggi-do (KR)

(73) Assignees: SAMSUNG SDS CO.. LTD., Seoul (KR); Kookmin University Industry Academny Cooperation Foundation, Seoul (KR)

( * ) Notice: Subject to any disclaimer, the term of this patent is extended or adjusted under 35 U.S.C. 154(b) by 528 days.

(21) Appl. No.: 16/664,825

(22) Filed: Oct. 26, 2019

(65) Prior Publication Data
US 2021/0105134 A1    Apr. 8, 2021

(30) Foreign Application Priority Data
Oct. 2, 2019 (KR) .......... 10-2019-0122600

(51) Int. Cl.
| | | |
|---|---|---|
| H04L 9/28 | (2006.01) |
| H04L 9/00 | (2022.01) |
| H04K 1/00 | (2006.01) |
| H04L 9/08 | (2006.01) |
| G06F 7/78 | (2006.01) |
| G06F 17/16 | (2006.01) |

(52) U.S. Cl.
CPC .............. *H04L 9/0852* (2013.01); *G06F 7/78* (2013.01); *G06F 17/16* (2013.01)

(58) Field of Classification Search
CPC ................................. H04L 9/0852; G06F 7/78
USPC ........................................................ 380/28
See application file for complete search history.

(56) References Cited

U.S. PATENT DOCUMENTS

| | | | | |
|---|---|---|---|---|
| 4,931,959 A | * | 6/1990 | Brenner ................... | G06E 3/006 359/107 |
| 7,216,140 B1 | * | 5/2007 | Chen ....................... | G06F 17/147 708/607 |
| 9,906,360 B2 | * | 2/2018 | Johnson ................. | H04L 9/0631 |
| 10,824,718 B2 | * | 11/2020 | Knezevic ................ | G06F 21/54 |

(Continued)

FOREIGN PATENT DOCUMENTS

KR    10-2014-0054647 A    5/2014

*Primary Examiner* — Monjur Rahim
(74) *Attorney, Agent, or Firm* — The PL Law Group, PLLC

(57) ABSTRACT

A method for performing a matrix multiplication operation being secure against side-channel attacks according to one embodiment, which is performed by a computing device comprising one or more processors and a memory storing one or more programs to be executed by the one or more processors, includes shuffling an order of execution of multiplication operations between elements of a first matrix and elements of a second matrix for a matrix multiplication operation between the first matrix and the second matrix; and performing the matrix multiplication operation based on the shuffled order of execution.

12 Claims, 2 Drawing Sheets

(56) References Cited

U.S. PATENT DOCUMENTS

| | | | |
|---|---|---|---|
| 11,240,013 B1* | 2/2022 | Vakili | H04L 9/0662 |
| 2004/0120518 A1* | 6/2004 | Macy | H04L 9/0631 |
| | | | 380/29 |
| 2015/0067875 A1* | 3/2015 | Johnson | H04L 9/0631 |
| | | | 726/26 |
| 2015/0161758 A1* | 6/2015 | Ashbaugh | G06T 1/20 |
| | | | 345/538 |
| 2015/0205759 A1* | 7/2015 | Israel | G06N 10/00 |
| | | | 703/2 |
| 2019/0325314 A1* | 10/2019 | Bourges-Sevenier | |
| | | | G06N 3/063 |
| 2020/0403771 A1* | 12/2020 | Satpathy | H04L 9/003 |

* cited by examiner

APPARATUS AND METHOD FOR PERFORMING MATRIX MULTIPLICATION OPERATION BEING SECURE AGAINST SIDE CHANNEL ATTACK

CROSS REFERENCE TO RELATED APPLICATIONS AND CLAIM OF PRIORITY

This application claims the benefit of Korean Patent Application No. 10-2019-0122600 filed on Oct. 2, 2019 in the Korean Intellectual Property Office, the disclosure of which is incorporated herein by reference in its entirety.

TECHNICAL FIELD

The following description relates to technology for preventing side-channel attacks.

BACKGROUND ART

Rivest-Shamir-Adleman (RSA) and elliptic curve cryptography, which are currently used public-key cryptography techniques, are based on mathematical problems, such as prime factorization of large numbers, the discrete logarithm problem in a ring or finite field, and the like. However, quantum computing technology can quickly solve problems that are difficult to solve with computing power currently in use. Moreover, the algorithm proposed by Shor in 1995 can solve the integer factorization problem and the discrete logarithm problem on a quantum computer in polynomial time. This means that most of the current public-key cryptosystems can be broken, and hence public key infrastructure on which web infrastructure relies may be put at risk. Thus, there is an increasing demand for post-quantum cryptography (PQC) as an alternative against these threats.

Currently, many algorithms proposed as PQC algorithms mainly use matrix operations. The matrix operations are used because design of a cryptographic algorithm that is secure even against a quantum computer can be configured by performing a matrix multiplication operation. However, matrix multiplication is vulnerable to side-channel attacks, such as a simple power analysis (SPA) attack, a differential power analysis (DPA) attack, a collision attack, and the like, and thus the currently proposed PQC algorithms using matrix multiplication are all vulnerable to side-channel attacks.

The disclosed embodiments are intended to provide an apparatus and method for performing a matrix multiplication operation being secure against side-channel attacks.

In one general aspect, there is provided a method, which is performed by a computing device comprising one or more processors and a memory storing one or more programs to be executed by the one or more processors, comprising: shuffling an order of execution of multiplication operations between elements of a first matrix and elements of a second matrix for a matrix multiplication operation between the first matrix and the second matrix; and performing the matrix multiplication operation based on the shuffled order of execution.

The matrix multiplication operation may be performed for at least one of encryption and decryption based on a post-quantum cryptographic (PQC) algorithm.

At least one of the first matrix and the second matrix may be secret information that is repeatedly used for performing at least one of the encryption and the decryption.

The shuffling may comprise shuffling the order of execution of the multiplication operations between the elements of the first matrix and the elements of the second matrix by changing an order of execution of vector multiplication operations for the matrix multiplication operation.

The shuffling may comprise shuffling the order of execution of the multiplication operations between the elements of the first matrix and the elements of the second matrix by changing an order of execution of multiplication operations between elements of a row vector and elements of a column vector for at least one of vector multiplication operations for the matrix multiplication operation.

The shuffling may comprise generating one or more progressions based on dimensions of the first matrix and the second matrix and shuffling the order of execution of the multiplication operations between the elements of the first matrix and the elements of the second matrix based on the one or more progressions.

In another general aspect, there is provided an apparatus including one or more processors; and a memory storing one or more programs to be executed by the one or more processors, wherein the programs include commands for perform operations comprising: shuffling an order of execution of multiplication operations between elements of a first matrix and elements of a second matrix for a matrix multiplication operation between the first matrix and the second matrix and performing the matrix multiplication operation based on the shuffled order of execution.

The matrix multiplication operation may be performed for at least one of encryption and decryption based on a PQC algorithm.

At least one of the first matrix and the second matrix may be secret information that is repeatedly used for performing at least one of the encryption and the decryption.

The shuffling may include shuffling the order of execution of the multiplication operations between the elements of the first matrix and the elements of the second matrix by changing an order of execution of vector multiplication operations for the matrix multiplication operation.

The shuffling may include shuffling the order of execution of the multiplication operations between the elements of the first matrix and the elements of the second matrix by changing an order of execution of multiplication operations between elements of a row vector and elements of a column vector for at least one of vector multiplication operations for the matrix multiplication operation.

The shuffling may include generating one or more progressions based on dimensions of the first matrix and the second matrix and shuffling the order of execution of the multiplication operations between the elements of the first matrix and the elements of the second matrix based on the one or more progressions.

According to the embodiments of the present disclosure, the order of multiplication operations that can be independently performed for a matrix multiplication operation is shuffled and the matrix multiplication operation is performed according to the shuffled order, so that a probability of the same intermediate value occurring at a specific time can be reduced and accordingly, the number of power waveforms required for side-channel attacks is increased, thereby effectively preventing side-channel attacks.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
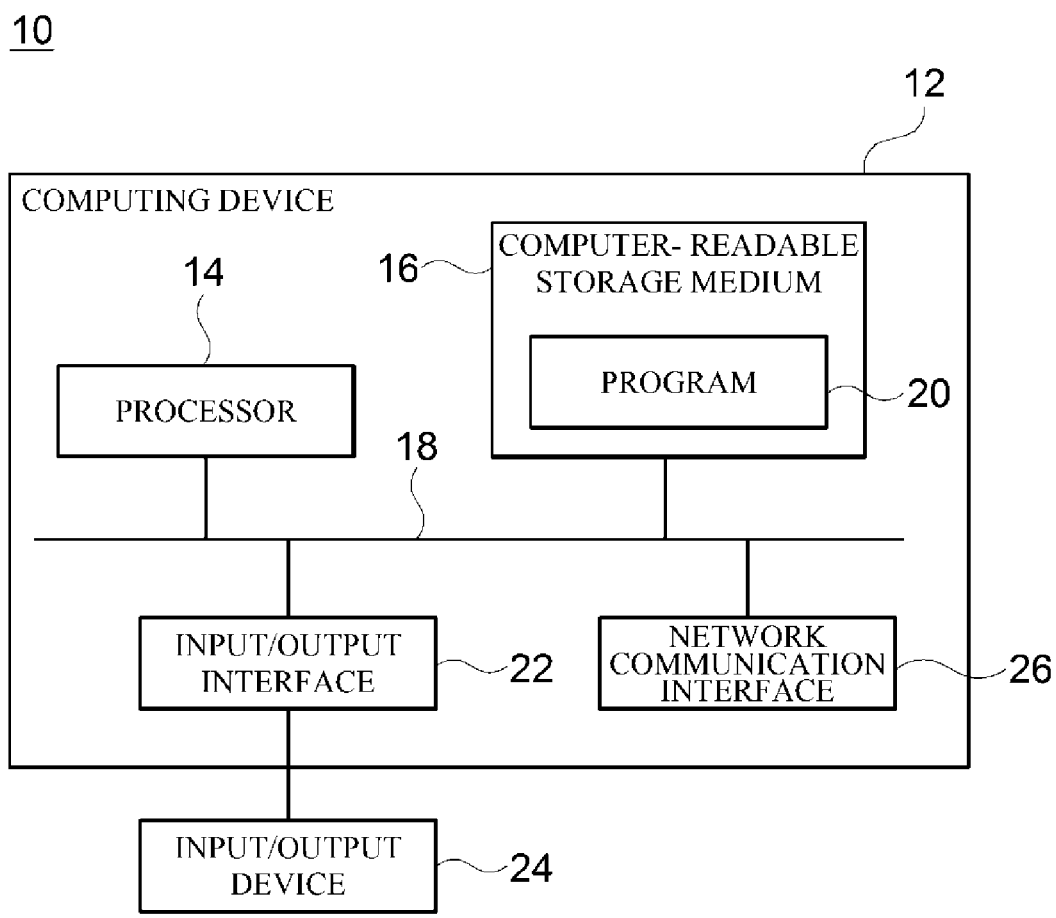
FIG. 1 is a block diagram for describing a computing environment including a computing device suitable to use in exemplary embodiments.

FIG. 1 is a block diagram for describing a computing environment including a computing device suitable to use in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be an apparatus for performing a method of performing a matrix multiplication operation according to embodiments of the present disclosure. The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the exemplary embodiment.

The computer-readable storage medium 16 is configured to store computer executable commands and program codes, program data and/or information in other suitable forms. The program 20 stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof), one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24, which is one component constituting the computing device 12, may be included inside the computing device 12 or may be configured as a device separate from the computing device 12 and be connected to the computing device 12.

In the following embodiments, a matrix is construed as including a vector matrix (i.e., a row vector or a column vector) including only one row or only one column, as well as a matrix including a plurality of rows and a plurality of columns.

In addition, the following embodiments may be performed in an encryption or decryption process according to a post-quantum cryptographic (PQC) algorithm, for example, QcBits, Rainbow, UOV, Frodo, and the like, which requires a matrix multiplication operation for performing at least one of encryption and decryption. Specifically, the computing device 12 may perform at least one of encryption and decryption using a PQC algorithm requiring a matrix multiplication operation, and when a matrix multiplication operation is needed in the process of encryption or decryption, may perform the corresponding matrix multiplication operation according to the following embodiments.

Figure 2:
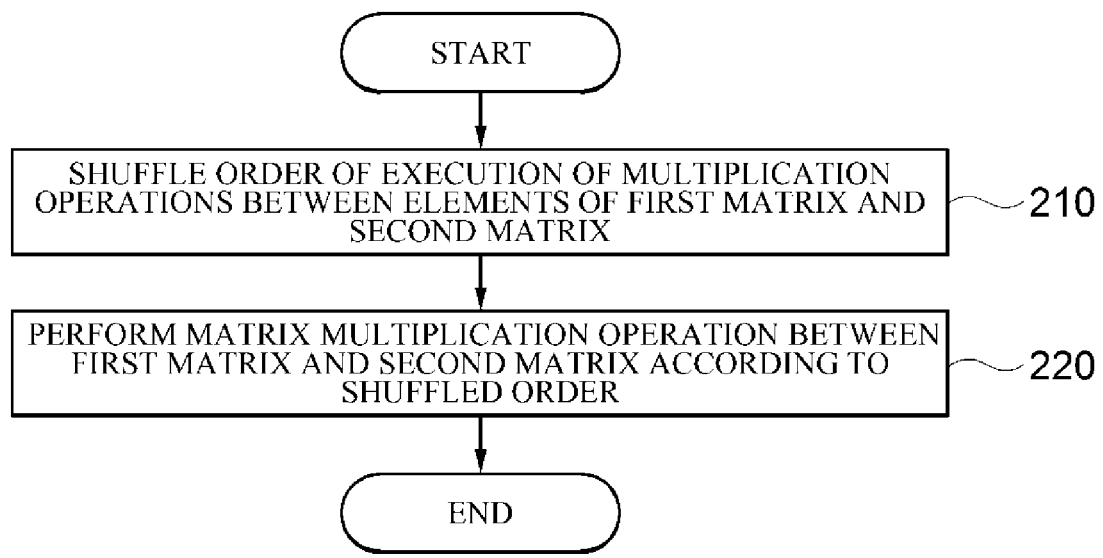
FIG. 2 is a flowchart illustrating a method of performing a matrix multiplication operation according to one embodiment of the present disclosure.

FIG. 2 is a flowchart illustrating a method of performing a matrix multiplication operation according to one embodiment of the present disclosure.

Referring to FIG. 2, the computing device 12 shuffles the execution order of multiplication operations between elements of a first matrix and elements of a second matrix for a matrix multiplication operation between the first matrix and the second matrix (210).

In this case, the first matrix and the second matrix mean a matrix in the left-hand side and a matrix in the right-hand side of a matrix multiplication operation, respectively. Specifically, in a case of a matrix multiplication operation AB between matrix A with a dimension of m×n and matrix B with a dimension of n×r, the first matrix is matrix A in the left-hand side and the second matrix is matrix B in the right hand side. Hereinafter, the first matrix and the second matrix will be used in the same sense as described above.

According to one embodiment, at least one of the first matrix and the second matrix may be secret information, such as a secret key, which is repeatedly used to perform at least one of encryption and decryption based on a PQC algorithm. Also, the order of execution of multiplication operations between the elements of the first matrix and the second matrix may be randomly shuffled each time a matrix multiplication operation is performed using one of the first matrix and the second matrix that is secret information.

According to one embodiment, the computing device 12 may shuffle the order of execution of multiplication operations between the elements of the first matrix and the second matrix by changing the order of execution of vector multiplication operations for the matrix multiplication operation between the first matrix and the second matrix. In this case, the vector multiplication means a matrix multiplication operation between a row vector (i.e., 1×n matrix) and a column vector (i.e., n×1 matrix) and is hereinafter used in the same sense.

Specifically, when the dimension of the first matrix is m×n and the dimension of the second matrix is n×r, a matrix multiplication operation between the first matrix and the second matrix may be performed according to Equation 1.

$$AB = \begin{bmatrix} a_{11} & a_{12} & \ldots & a_{1n} \\ a_{21} & a_{22} & \ldots & a_{2n} \\ \vdots & \vdots & \vdots & \vdots \\ a_{m1} & a_{m2} & \ldots & a_{mn} \end{bmatrix} \begin{bmatrix} b_{11} & b_{12} & \ldots & b_{1r} \\ b_{21} & b_{22} & \ldots & b_{2r} \\ \vdots & \vdots & \ldots & \vdots \\ b_{n1} & b_{n2} & \ldots & b_{nr} \end{bmatrix} =$$

$$\begin{bmatrix} x_{11} & x_{12} & \ldots & x_{1r} \\ x_{21} & x_{22} & \ldots & x_{2r} \\ \vdots & \vdots & \ldots & \vdots \\ x_{m1} & x_{i2} & \ldots & x_{mr} \end{bmatrix} = X$$

[Equation 1]

In Equation 1, A denotes the first matrix, B denotes the second matrix, and X denotes a result matrix acquired by a matrix multiplication operation between the first matrix and the second matrix. In addition, $a_{ij}$ (here, $i \in \{1, 2, \ldots, m\}$ and $j \in \{1, 2, \ldots, n\}$) denotes an element of the first matrix A, $b_{jk}$ (here, $k \in \{1, 2, \ldots, r\}$) denotes an element of the second matrix B and $x_{ik}$ denotes an element of the result matrix X.

In Equation 1, each of the elements $x_{ik}$ of the result matrix X may be independently calculated through a vector multiplication operation between the i-th row vector among the row vectors included in the first matrix A and the k-th column vector among the column vectors included in the second matrix B, as shown in Equation 2 below.

$$x_{ik} = \begin{bmatrix} a_{i1} & a_{i2} & \ldots & a_{in} \end{bmatrix} \begin{bmatrix} b_{1k} \\ b_{2k} \\ \vdots \\ b_{nk} \end{bmatrix} = \sum_{j=1}^{n} a_{ij} \cdot b_{jk}$$

[Equation 2]

Thus, even when the order of execution of the vector multiplication operations to be executed for the matrix multiplication operation between the first matrix A and the second matrix B is changed, the same result as before the change may be acquired.

Meanwhile, as can be seen in Equation 2, a vector multiplication operation between the i-th row vector among the row vectors included in the first matrix A and the k-th column vector among the column vectors included in the second matrix B is performed by an multiplication operation $a_{ij} \cdot b_{jk}$ between an element $a_{ij}$ included in the i-th row vector and an element $b_{jk}$ included in the k-th column vector and the addition of the multiplication operation results. Therefore, when the order of execution of the vector multiplication operations to be executed for the matrix multiplication operation between the first matrix A and the second matrix B is changed, the order of operations in the multiplication operation $a_{ij} \cdot b_{jk}$ between the element $a_{ij}$ included in the first matrix A and the element $b_{jk}$ included in the second matrix B is also changed.

Hence, the computing device 12 may shuffle the order of execution of the multiplication operations between the elements of the first matrix and the second matrix for the matrix multiplication operation between the first matrix and the second matrix by changing the order of execution of the vector multiplication operations for the matrix multiplication operation between the first matrix and the second matrix.

According to one embodiment, the computing device 12 may shuffle the order of execution of the multiplication operations between the elements of the first matrix and the second matrix by changing the order of execution of the multiplication operations between elements of the row vector and elements of a column vector for at least one of the vector multiplication operations for the matrix multiplication operation between the first matrix and the second matrix.

Specifically, as described above, the vector multiplication operation between the i-th row vector among the row vectors included in the first matrix A and the k-th column vector among the column vectors included in the second matrix B is performed by the multiplication operation $a_{ij} \cdot b_{jk}$ and the addition of the multiplication operation results, as shown in Equation 2. In this case, the multiplication operation $a_{ij} \cdot b_{jk}$ is an operation which can be independently calculated and a value of $x_{ik}$ is not changed even when the order of execution is changed.

Hence, the computing device 12 may shuffle the order of execution of multiplication operations between the elements of the first matrix and the second matrix for the matrix multiplication operation between the first matrix and the second matrix by changing the order of execution of multiplication operations between the elements of the row vector and the elements of the column vector for at least one of the vector multiplication operations for the matrix multiplication operation between the first matrix and the second matrix.

Then, the computing device 12 performs the matrix multiplication operation between the first matrix and the second matrix according to the shuffled order of execution (220).

Meanwhile, in a case where at least one of the order of vector multiplication operations and the order of the multiplication operations between the elements of the row vector and the elements of the column vector for the vector multiplication operation is changed each time the matrix multiplication operation between the first matrix and the second matrix is performed, a probability of the same intermediate value occurring at a specific time in the course of performing a corresponding matrix multiplication operation is decreased to 1/ρ (here, ρ=m×n×r). Therefore, in this case, the number of power waveforms required for side-channel attacks is increased by $ρ^2$ times, so that the side-channel attacks can be effectively prevented.

In the flowchart illustrating in FIG. 2, the method is described as being divided into a plurality of operations, at least some of the operations may be performed in different order or may be combined into fewer operations or further divided into more operations. In addition, some of the operations may be omitted, or one or more extra operations, which are not illustrated, may be added to the flowchart and be performed.

Hereinafter, a detailed example will be described in which a method of performing a matrix multiplication operation according to one embodiment of the present disclosure is applied to a matrix multiplication operation AB between a first matrix $$A = \begin{bmatrix} a_{11} & a_{12} & a_{13} \\ a_{21} & a_{22} & a_{23} \end{bmatrix}$$

with a dimension of 2×3 and a second matrix $$B = \begin{bmatrix} b_{11} & b_{12} \\ b_{21} & b_{22} \\ b_{31} & b_{32} \end{bmatrix}$$

with a dimension of 3×2.

Specifically, the matrix multiplication operation AB may be performed according to Equation 3 below.

$$AB = \begin{bmatrix} a_{11} & a_{12} & a_{13} \\ a_{21} & a_{22} & a_{23} \end{bmatrix} \begin{bmatrix} b_{11} & b_{12} \\ b_{21} & b_{22} \\ b_{31} & b_{32} \end{bmatrix} = \begin{bmatrix} x_{11} & x_{12} \\ x_{21} & x_{22} \end{bmatrix} = X \quad \text{[Equation 3]}$$

Also, elements of a result matrix X may be acquired through vector multiplication operations between each row vector included in the first matrix A and each column vector included in the second matrix B, as shown in Equation 4 to 7 below.

$$x_{11} = \begin{bmatrix} a_{11} & a_{12} & a_{13} \end{bmatrix} \begin{bmatrix} b_{11} \\ b_{21} \\ b_{31} \end{bmatrix} = a_{11} \cdot b_{11} + a_{12} \cdot b_{21} + a_{13} \cdot b_{31} \quad \text{[Equation 4]}$$

$$x_{12} = \begin{bmatrix} a_{11} & a_{12} & a_{13} \end{bmatrix} \begin{bmatrix} b_{12} \\ b_{22} \\ b_{32} \end{bmatrix} = a_{11} \cdot b_{12} + a_{12} \cdot b_{22} + a_{13} \cdot b_{32} \quad \text{[Equation 5]}$$

$$x_{21} = \begin{bmatrix} a_{21} & a_{22} & a_{23} \end{bmatrix} \begin{bmatrix} b_{11} \\ b_{21} \\ b_{31} \end{bmatrix} = a_{21} \cdot b_{11} + a_{22} \cdot b_{21} + a_{23} \cdot b_{31} \quad \text{[Equation 6]}$$

$$x_{22} = \begin{bmatrix} a_{21} & a_{22} & a_{23} \end{bmatrix} \begin{bmatrix} b_{12} \\ b_{22} \\ b_{32} \end{bmatrix} = a_{21} \cdot b_{12} + a_{22} \cdot b_{22} + a_{23} \cdot b_{32} \quad \text{[Equation 7]}$$

In this case, according to one embodiment, the computing device 12 may generate one or more progressions based on the dimensions of the first matrix A and the second matrix B and shuffle the order of execution of multiplication operations between the elements of the first matrix and the elements of the second matrix for the matrix multiplication operation between the first matrix and the second matrix based on the one or more generated progressions.

Specifically, according to one embodiment, the computing device 12 may generate at least one of a first random progression with the same length as the number of rows (i.e., 2) of the first matrix A and a second random progression with the same length as the number of columns (i.e., 2) of the second matrix B and change the order of execution of the vector multiplication operations according to the generated random progression.

In this case, numbers included in the first random progression may represent indices of the row vector included in the first matrix A and a position of each of the numbers in the first random progression may represent the order of execution. Similarly, each of the numbers included in the second random progression may represent an index of the column vector included in the second matrix B and a position of each of the numbers in the second random progression may represent the order of execution.

For example, in a case where the first random progression is $S_1=\{2, 1\}$ and the second random progression is $S_2=\{1, 2\}$, the computing device 12 may perform the vector multiplication operations in the order of Equation 6, Equation 7, Equation 4, and Equation 5.

According to one embodiment, the computing device 12 may generate one or more third random progressions with the same length as the number of columns (i.e., 3) of the first matrix A. In this case, the computing device 12 may change the order of multiplication operations between the elements of the row vector and the elements of the column vector for at least one of the vector multiplication operations in accordance with Equation 4 to 7 according to the one or more generated third random progressions.

In this case, each number included in the third random progression may represent an index of each element included in the column vector and a position of each of the numbers in the third random progression may represent the order of execution.

For example, in a case where the third random progression is $S_3=\{3, 2, 1\}$, the computing device 12 may perform at least one of the following: change the order of multiplication operations for the vector multiplication operation in accordance with Equation 4 to $a_{13} \cdot b_{31} \Rightarrow a_{12} \cdot b_{21} \Rightarrow a_{11} \cdot b_{11}$; change the order of multiplication operations for the vector multiplication operation in accordance with Equation 5 to $a_{13} \cdot b_{32} \Rightarrow a_{12} \cdot b_{22} \Rightarrow a_{11} \cdot b_{12}$; change the order of multiplication operations for the vector multiplication operation in accordance with Equation 6 to $a_{23} \cdot b_{31} \Rightarrow a_{22} \cdot b_{21} \Rightarrow a_{21} \cdot b_{11}$; and change the order of multiplication operations for the vector multiplication operation in accordance with Equation 7 to $a_{23} \cdot b_{32} \Rightarrow a_{22} \cdot b_{22} \Rightarrow a_{21} \cdot b_{12}$.

In another example, the computing device 12 may generate a plurality of third random progressions that are different from each other and each correspond to one of the vector multiplication operations in accordance with Equations 4 to 7, and may change the order of multiplication operations for some of the vector multiplication operations in accordance with Equations 4 to 7 according to the plurality of generated third random progressions. Specifically, the computing device 12 may generate a third random progression $S_{3,1}=\{3, 2, 1\}$ that corresponds to the vector multiplication operation in accordance with Equation 4 and a third random progression $S_{3,2}=\{2, 1, 3\}$ that corresponds to the vector multiplication operation in accordance with Equation 5. In this case, the computing device 12 may change the order of multiplication operations for the vector multiplication operation in accordance with Equation 4 to $a_{13} \cdot b_{31} \Rightarrow a_{12} \cdot b_{21} \Rightarrow a_{11} \cdot b_{11}$ on the basis of $S_{3,1}$ and change the order of multiplication operations for the vector multiplication operation in accordance with Equation 5 to $a_{12} \cdot b_{22} \Rightarrow a_{11} \cdot b_{12} \Rightarrow a_{13} \cdot b_{32}$ on the basis of $S_{3,1}$.

Although in the above example, it is described that the order of execution of multiplication operations between the elements of the first matrix A and the second matrix B is shuffled, the method for shuffling the order of execution may be performed in various ways in addition to the above-described example, and is not necessarily limited to a specific method.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method which is performed by a computing device comprising one or more processors and a memory storing one or more programs to be executed by the one or more processors, the method comprising:
shuffling an order of execution of multiplication operations between elements of a first matrix and elements of a second matrix for a matrix multiplication operation between the first matrix and the second matrix; and
performing the matrix multiplication operation based on the shuffled order of execution,
wherein the shuffling comprises shuffling the order of execution of the multiplication operations between the elements of the first matrix and the elements of the second matrix by changing an order of execution of vector multiplication operations for the matrix multiplication operation,
wherein the vector multiplication operation means the matrix multiplication operation between a row vector and a column vector.

2. The method of claim 1, wherein the matrix multiplication operation is performed for at least one of encryption and decryption based on a post-quantum cryptographic (PQC) algorithm.

3. The method of claim 2, wherein at least one of the first matrix and the second matrix is secret information that is repeatedly used for performing at least one of the encryption and the decryption.

4. The method of claim 1, wherein the shuffling comprises shuffling the order of execution of the multiplication operations between the elements of the first matrix and the elements of the second matrix by changing an order of execution of multiplication operations between elements of a row vector and elements of a column vector for at least one of vector multiplication operations for the matrix multiplication operation.

5. The method of claim 1, wherein the shuffling comprises generating one or more progressions based on dimensions of the first matrix and the second matrix and shuffling the order of execution of the multiplication operations between the elements of the first matrix and the elements of the second matrix based on the one or more progressions.

6. An apparatus comprising:
one or more processors; and
a memory storing one or more programs to be executed by the one or more processors,
wherein the programs include commands to perform operations comprising:
shuffling an order of execution of multiplication operations between elements of a first matrix and elements of a second matrix for a matrix multiplication operation between the first matrix and the second matrix; and
performing the matrix multiplication operation based on the shuffled order of execution,
wherein the shuffling comprises shuffling the order of execution of the multiplication operations between the elements of the first matrix and the elements of the second matrix by changing an order of execution of vector multiplication operations for the matrix multiplication operation,
wherein the vector multiplication operation means the matrix multiplication operation between a row vector and a column vector.

7. The apparatus of claim 6, wherein the matrix multiplication operation is performed for at least one of encryption and decryption based on a post-quantum cryptographic (PQC) algorithm.

8. The apparatus of claim 7, wherein at least one of the first matrix and the second matrix is secret information that is repeatedly used for performing at least one of the encryption and the decryption.

9. The apparatus of claim 6, wherein the shuffling comprises shuffling the order of execution of the multiplication operations between the elements of the first matrix and the elements of the second matrix by changing an order of execution of multiplication operations between elements of a row vector and elements of a column vector for at least one of vector multiplication operations for the matrix multiplication operation.

10. The apparatus of claim 6, wherein the shuffling comprises generating one or more progressions based on dimensions the first matrix and the second matrix and shuffling the order of execution of the multiplication operations between the elements of the first matrix and the elements of the second matrix based on the one or more progressions.

11. A method which is performed by a computing device comprising one or more processors and a memory storing one or more programs to be executed by the one or more processors, the method comprising:
shuffling an order of execution of multiplication operations between elements of a first matrix and elements of a second matrix for a matrix multiplication operation between the first matrix and the second matrix; and
performing the matrix multiplication operation based on the shuffled order of execution,
wherein the shuffling comprises shuffling at least one of the order of vector multiplication operations and the order of the multiplication operations between elements of a row vector and elements of a column vector for the vector multiplication operation each time the matrix multiplication operation between the first matrix and the second matrix is performed,
wherein the vector multiplication operation means the matrix multiplication operation between the row vector and the column vector.

12. An apparatus comprising:
one or more processors; and
a memory storing one or more programs to be executed by the one or more processors,
wherein the programs include commands to perform operations comprising:
shuffling an order of execution of multiplication operations between elements of a first matrix and elements of a second matrix for a matrix multiplication operation between the first matrix and the second matrix; and
performing the matrix multiplication operation based on the shuffled order of execution,
wherein the shuffling comprises shuffling at least one of the order of vector multiplication operations and the order of the multiplication operations between elements of a row vector and elements of a column vector for the vector multiplication operation each time the matrix multiplication operation between the first matrix and the second matrix is performed, wherein the vector multiplication operation means the matrix multiplication operation between the row vector and the column vector.

\* \* \* \* \*